(12) United States Patent
Ohashi et al.

(10) Patent No.: US 8,025,200 B2
(45) Date of Patent: *Sep. 27, 2011

(54) FRICTION STIR WELDING MACHINE AND FRICTION STIR WELDING TOOL

(75) Inventors: Ryoji Ohashi, Kobe (JP); Mitsuo Fujimoto, Kobe (JP); Shinji Koga, Kobe (JP); Atsushi Kato, Seto (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/923,663

(22) Filed: Oct. 1, 2010

(65) Prior Publication Data

US 2011/0084116 A1 Apr. 14, 2011

Related U.S. Application Data

(63) Continuation of application No. 11/717,108, filed on Mar. 13, 2007, now Pat. No. 7,828,191.

(30) Foreign Application Priority Data

Jul. 28, 2006 (JP) .................. 2006-207214

(51) Int. Cl.
 *B23K 20/12* (2006.01)
(52) U.S. Cl. ................. 228/2.1; 228/112.1; 408/230
(58) Field of Classification Search ............ 228/2.1, 228/112.1; 408/36, 226, 227, 230
See application file for complete search history.

(56) References Cited

U.S. PATENT DOCUMENTS

| | | | |
|---|---|---|---|
| 5,828,127 A | 10/1998 | Yamagata et al. | |
| 6,237,835 B1* | 5/2001 | Litwinski et al. | 228/112.1 |
| 6,866,181 B2 | 3/2005 | Aota et al. | |
| 6,874,672 B2* | 4/2005 | Okamoto et al. | 228/112.1 |
| 7,152,776 B2 | 12/2006 | Nelson et al. | |
| 7,163,136 B2* | 1/2007 | Hempstead | 228/2.1 |
| 7,198,189 B2* | 4/2007 | Stol et al. | 228/2.1 |
| 7,364,390 B2* | 4/2008 | Krenzer et al. | 408/230 |
| 7,461,769 B2* | 12/2008 | Waldron et al. | 228/2.1 |
| 7,828,191 B2* | 11/2010 | Ohashi et al. | 228/2.1 |
| 2002/0014516 A1 | 2/2002 | Nelson et al. | |
| 2003/0075584 A1 | 4/2003 | Sarik et al. | |
| 2005/0156010 A1 | 7/2005 | Flak et al. | |

FOREIGN PATENT DOCUMENTS

| | | |
|---|---|---|
| EP | 1 430 986 A1 | 6/2004 |
| EP | 1 688 208 A1 | 8/2006 |
| JP | A-2000-301363 | 10/2000 |
| JP | A-2002-248583 | 9/2002 |
| JP | A-2003-260572 | 9/2003 |
| JP | A-2003-326372 | 11/2003 |
| JP | A-2004-082144 | 3/2004 |
| JP | A-2004-136365 | 5/2004 |
| JP | A-2004-337860 | 12/2004 |
| JP | A-2005-199281 | 7/2005 |

* cited by examiner

*Primary Examiner* — Roy King
*Assistant Examiner* — Michael Aboagye
(74) *Attorney, Agent, or Firm* — Oliff & Berridge, PLC

(57) ABSTRACT

A friction stir welding machine is provided that is adapted to perform solid phase welding on a welding portion of materials to be welded, by pressing a welding tool against the welding portion of the materials to be welded while rotating the welding tool, and forcing the welding tool to be advanced into a softened portion which is softened by a frictional heat while stirring the softened portion, wherein a coating made of aluminum nitride is formed on at least a region of the welding tool to be in contact with the materials to be welded.

4 Claims, 15 Drawing Sheets

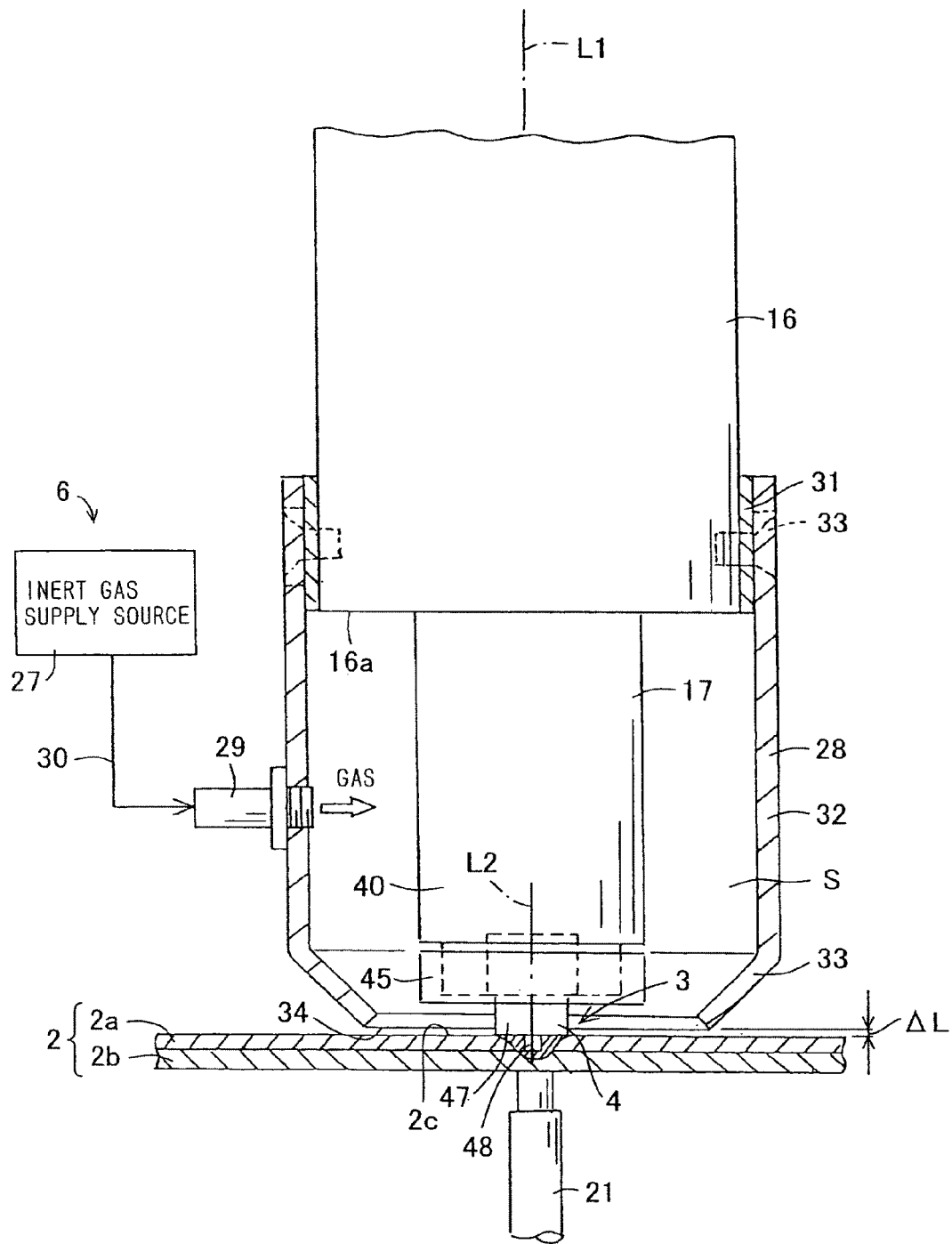
F I G. 2

RESULTS OF IDENTIFICATION FOR THE COATING SUBSTANCE BY X-RAY DIFFRACTION

RELATIONSHIP BETWEEN THE WELDING TIME AND THE TENSILE SHEAR LOAD AT RESPECTIVE ROTATIONAL SPEEDS OF THE TOOL

SUPERIORITY OF THE AIN COATING IN PREVENTION OF WEAR (NUMBER OF WELDING OPERATIONS VS AMOUNT OF REDUCTION OF THE PIN DIAMETER)

FRICTION STIR WELDING MACHINE AND FRICTION STIR WELDING TOOL

CROSS REFERENCE TO RELATED APPLICATIONS

This is a Continuation of application Ser. No. 11/717,108 filed Mar. 13, 2007 (now U.S. Pat. No. 7,828,191). The disclosure of the prior application is hereby incorporated by reference herein in its entirety. This application is based upon the prior Japanese Patent Application No. 2006-207214 filed on Jul. 28, 2006, the entire contents of which are incorporated herein by reference.

BACKGROUND OF THE INVENTION

1. Field of the Invention

The present invention relates to a friction stir welding machine and a friction stir welding tool, which can be appropriately utilized for welding materials to be welded together, the mater comprising steel materials, such as steel materials to be used for general structures, those for constructional structures and those for steel plates.

2. Description of the Related Art

A typical example of the related art is described in JP-A-2004-082144. This related art teaches a welding tool comprising a pin portion adapted to be in contact with a material to be welded is formed integrally on a central axis of a base material consisting of a heat resistive alloy, wherein lowering of hardness in a higher temperature region can be controlled as well as degradation of strength against friction to the material to be welded, such as a steel material, can be reduced by covering the outer periphery including the pin portion with a coating comprising a ceramic of the silicon nitride ($Si_3N_4$) type.

In such a related art, the steel material which is provided as SS400 in JIS (the Japanese Industrial Standard) is used as the material to be welded, and the base material of the welding tool comprises a heat resistive alloy mainly consisting of at least one of Fe, Ni, Co and W.

Other related arts are described in JP-A-2000-301363 and JP-A-248583, for example. In these related arts, improvement against insufficient welding is proposed, which comprises spraying an inert gas, such as $N_2$, He or Ar, in the vicinity of a welding portion (i.e., a portion to be welded) of materials to be welded.

Still another related art is described in JP-A-2003-326372. In this related art, lengthening of the life of a welding tool is proposed, wherein a coating comprising diamond is formed on a surface of a base material of the welding tool so as to prevent components of a material to be welded, comprising an aluminum alloy, a magnesium alloy, a copper alloy or the like, from being welded or alloyed together with the welding tool.

In the related art described in JP-A-2004-082144, since a steel material which has a melting point higher than that of aluminum alloys is used as an object to be welded with friction stir, a welding tool on which a coating comprising a silicon nitride or the like is formed should be used. Such a welding tool may tend to generate chemical decomposition of a material constituting the welding tool and/or diffusion of its constructional elements into the material to be welded due to heat generation caused by friction to the material to be welded, thus causing significant wearing at the working site, such as a shoulder portion or pin portion of the welding tool, which is to be used for generating driving force of stir by contacting with the materials to be welded.

In the case of using a hard metal, such as tungsten carbide, as the base material of the welding tool, the standard energy to be produced from the material at 100° C. is relatively high, i.e., approximately −10 kcal/g·atom. Therefore, the material may tend to be decomposed under a higher temperature environment, thus being thermally unstable. In addition, such a material is likely to cause solid solution of tungsten into the steel material. Thus, wearing of the welding tool to be caused by such phenomena deteriorates the mechanical integrity of the region to be used for friction stir, leading to degradation of the strength of welding. Furthermore, since the life of such an expensive welding tool is ended only by a slight use, there is also a problem from the economical view point.

In the friction stir welding operation for a steel material, the rotational speed of the welding tool is often 250 to 1500 rpm. If employing a rotational speed higher than 1500 rpm, the amount of heat generation can be increased and the materials to be welded can be heated more rapidly, thus reducing the time required for welding as well as enhancing the strength of welding. However, wearing of the welding tool is accelerated. Moreover, in view of the life of such an expensive welding tool, there is a significant limit to be considered in increasing the rotational speed. Therefore, the reduction of the time required for welding and enhancement of the strength of welding are restricted in employing the aforementioned welding tool.

In each of the related arts described in JP-A-2000-301363 and JP-A-2002-248583, control of production of oxides is proposed, in which an inert gas is sprayed in the vicinity of a welding portion of a material to be welded to improve insufficient welding. However, in the case where the material to be welded is a steel material, there is a problem similar to that in the related art in JP-A-2004-082144 described above.

In the related art of JP-A-2003-326372 described above, lengthening of the life of a welding tool is proposed, wherein a coating comprising diamond is formed on a surface of a base material of the welding tool so as to prevent components of a material to be welded from being welded or alloyed together with the welding tool. However, also in this related art, when a steel material is used as the material to be welded, carbon which is a constructional element of the coating reacts chemically with the steel material, resulting in a similar problem as that described in each related art of the aforementioned JP-A-2000-301363 and JP-A-2002-248583.

SUMMARY OF THE INVENTION

Therefore, it is an object to provide a friction stir welding machine and a friction stir welding tool, which can enhance durability of a welding tool, reduce the time required for welding materials to be welded due to a high speed rotation of the welding tool, and prevent lowering of the strength of a welding portion of materials to be welded.

The present invention is a friction stir welding machine adapted to perform solid phase welding on a welding portion of materials to be welded, by pressing a welding tool against the welding portion of the materials to be welded while rotating the welding tool, and forcing the welding tool to be advanced into a softened portion which is softened by a frictional heat while stirring the softened portion, wherein a coating made of aluminum nitride is formed on at least a region of the welding tool to be in contact with the materials to be welded.

Preferably, the present invention is the friction stir welding machine described above, further comprising an inert gas supply means for supplying an inert gas toward the welding portion into which the welding tool is advanced.

Preferably, the present invention is the friction stir welding machine described above, wherein the coating is formed by any one of chemical vapor deposition, physical vapor deposition and thermal spraying.

The present invention is a friction stir welding tool for use in performing solid phase welding on a welding portion of materials to be welded, by pressing the welding tool against the welding portion of the materials to be welded while rotating the welding tool, and forcing the welding tool to be advanced into a softened portion which is softened by frictional heat while stirring the softened portion, wherein a coating comprising aluminum nitride is formed on at least a region of the welding tool to be in contact with the materials to be welded.

Preferably, the present invention is the friction stir welding tool described above, wherein the coating is formed by any one of chemical vapor deposition, physical vapor deposition and thermal spraying.

According to the present invention, a steel material is an object to be welded. A welding portion of the materials to be welded is subjected to solid phase welding by pressing a welding tool, on which a coating is formed, against the welding portion of the materials to be welded while rotating the welding tool, and forcing the welding tool to be advanced into a portion softened by frictional heat while stirring the softened portion.

Since the coating of the welding tool is formed on at least a region to be in contact with the materials to be welded, and comprises aluminum nitride which has a low affinity to the materials to be welded, wear to be caused by chemical reaction between the materials to be welded and the welding tool can be prevented, thereby lengthening the life of welding tool.

The welding portion is blocked from the atmosphere by an inert gas supplied from the inert gas supply means, thus preventing degradation, damage and peeling of the welding tool due to oxidation of the coating.

Since the surface of the welding tool is covered with a coating comprising aluminum nitride, wear to be caused by chemical reaction of the welding tool with the materials to be welded can be prevented and the time required for welding the materials to be welded can be reduced by increasing the rotational speed of the welding tool, thereby enhancing efficiency of the welding work. By enabling a higher speed rotation of the welding tool, the amount of frictional heat to be generated by its contact with the materials to be welded can be increased, thus extending the region of the welding portion to be stirred, thereby enhancing the strength of welding between the materials to be welded. Since wear of the welding tool can be prevented due to the coating comprising aluminum nitride, solid solution to be caused by diffusion of constructional elements of the welding tool into the materials to be welded can be prevented, thereby preventing degradation of the strength of the welding portion of the materials to be welded.

According to the present invention, since a coating comprising aluminum nitride is formed on the surface of the welding tool, wear of the welding tool can be prevented, thus enhancing durability of the welding tool and lengthening the life of the welding tool. In addition, since the durability against wear of the coating of the welding tool can also be enhanced, the rotational speed of the welding tool can be increased, thereby to improve efficiency of the welding work. Furthermore, since the amount of heat to be generated by friction with the materials to be welded can be increased due to a higher rotational speed of the welding tool, the stirred region in the materials to be welded can be extended, thus improving the strength of welding at the welding portion of the materials to be welded. Moreover, by forming the coating comprising aluminum nitride on the surface of the welding tool, incorporation of detrimentally reactive elements of the welding tool into the welding portion, which may lead to degradation of the strength of welding, can be prevented.

Additionally, since the welding portion can be blocked from the atmosphere due to the inert gas, degradation, damage and peeling of the welding tool due to oxidation of the coating can also be prevented.

BRIEF DESCRIPTION OF THE DRAWINGS

The above and other objects features and advantages of the present invention will become more apparent from the following description taken in connection with the accompanying drawings, in which:

FIG. 2 is a partially enlarged view showing a state in which a pin portion 48 of a welding tool 4 is advanced into materials to be welded;

FIG. 6(4) shows a state in which the welding tool 4 is completed after full integration of the pre-coat 50a with the base material 51;

DESCRIPTION OF THE PREFERRED EMBODIMENTS

Figure 1:
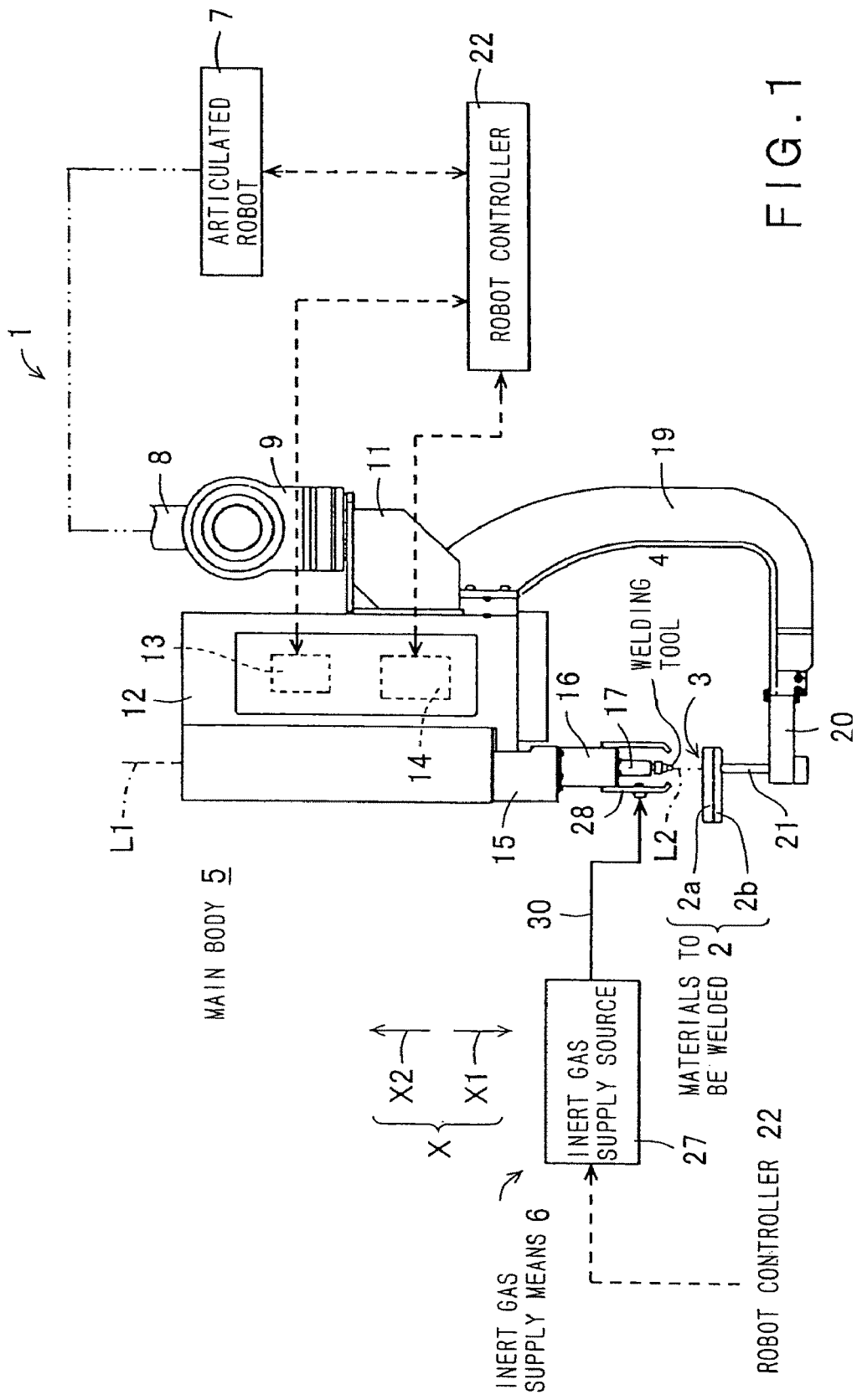
FIG. 1 is a front view showing a friction stir welding machine 1 of one embodiment according to the present invention.

Referring to FIGS. 1 and 2, the friction stir welding machine 1 comprises a main body 5 which is adapted to press the welding tool 4 against a welding portion 3 of materials 2 to be welded, each of which comprises a steel material, while rotating the welding tool 4, and force the tool 4 to be advanced into a portion softened by frictional heat while stirring the softened portion, so as to provide solid phase welding to the welding portion 3 of the materials 2, and an inert gas supply means 6 for supplying an inert gas to the welding tool 4.

For example, the main body 5 is positioned at a wrist 9 of a robot arm 8 of an articulated robot 7 so as to perform spot welding on each welding portion 3 of the materials 2 to be welded together by moving the welding tool 4 along an axis L1. The materials 2 are ones used for bodies of automobiles or structural materials of vehicles and comprise two sheets of steel plates 2a, 2b which are to be welded to each other. Hereinafter, a case in which these materials 2 to be welded together are subjected to spot welding due to friction stir welding (FSW) by using the friction stir welding machine 1 of one embodiment according to the present invention will be described.

The steel material used in this embodiment is classified, in respect of its composition, into cast iron, carbon steel, alloy steel or the like, while it is referred to, in regard to its use, as a steel product which is classified into pig iron used for casting, rolled steel, cast steel, forged steel or the like. It is noted that the present invention does not exclude aluminum alloys having lower melting points as compared with the steel materials described above, as the materials 2 to be welded, and the friction stir welding for such alloys can also be achieved by using the friction stir welding machine 1 of this embodiment.

The main body 5 includes an attachment 11 to which the wrist 9 of the articulated robot 7 is detachably secured by using a plurality bolts or the like, a base 12 to which the attachment 11 is fixed on its one side, a lift driving source 13 housed in the base 12, a rotation driving source 14 housed in the base 12, a lifting member 15 provided to the base 12 movably in the vertical direction along the axis L1, a tool holding member 16 provided at the bottom end of the lifting member 15 to project therefrom, a stirring rod 17 projecting from the bottom end of the tool holding member 16, the welding tool 4 detachably provided to the stirring rod 17, a bending arm 19 which is bent to have a generally L-shape defined from its top end fixed to the one side of the base 12 to its bottom end arranged below the base 12, a receiver 20 provided at the bottom end of the bending arm 19, a rod-like supporting member 21 provided at the receiver 20 and adapted to support the materials 2 below the welding tool 4, and a robot controller 22 for controlling operations of the articulated robot 7, lift driving source 13, rotation driving source 14 and inert gas supply means 6.

The lift driving source 13 is composed of a servomotor, and a lifting power transmission means for transmitting rotational force of the servomotor to the lifting member 15, such that the force is used to move the lifting member 15 linearly in the vertical direction along the axis L1. The lifting power transmission means is achieved by employing a ball screw mechanism or the like. The rotation driving source 14 is composed of a servomotor, and a rotational power transmission means for transmitting rotational force of the servomotor to the stirring rod 17, such that the force is used to rotate the stirring rod 17 about the axis L1. The rotational power transmission means is constructed with a timing belt and a plurality of pulleys around which the timing belt is wound.

The robot controller 22 is configured to respond to an instruction inputted from an input device, such as a personal computer or teaching pendant, execute a pre-set operational program, control the articulated robot 7, lift driving source 13, rotation driving source 14 and inert gas supply means 6 in accordance with respectively predetermined operational conditions, and provide spot welding to the materials 2 to be welded which are supplied onto the supporting member 21.

The predetermined operational conditions, for example, include the rotational speed of the welding tool 4, amount of advancing the welding tool 4 into the welding portion 3, time required for the advancement into the material, pressing force, timings to begin and stop the supply of an inert gas due to the inert gas supply means 6, and the like. The robot controller 22 can also be provided by employing a computer, and includes a memory device in which the operational program is stored, a main control unit, an output device and the like.

The inert gas supply means 6 is composed of a pressure vessel in which an inert gas, for example, argon (Ar) gas, is filled and a pressure/flow-rate adjusting unit, and includes an inert gas supply source 27 which can supply the inert gas to be discharged via a valve of the pressure vessel, at a predetermined flow rate and secondary pressure, in accordance with a control signal from the robot controller 22, a generally cylindrical cover 28 externally surrounding a portion of the stirring rod 17 projecting downward from the tool holding member 16 and the welding tool 14, a nipple 29 connected with the cover 28, a gas introduction tube 30 for introducing an inert gas to be discharged from the inert gas supply source 27 into the nipple 29, and a cylindrical sealing member 31 interposed between the tool holding member 16 and the cover 28.

The cover 28 is connected with a cylindrical barrel portion 32 at its one end along the axial direction, and includes a guide portion 33 having a truncated conical shape whose diameter is decreased as its position is moved apart from the barrel body 32. The other end of the barrel portion 32 in the axial direction is detachably attached to a bottom end portion of the tool holding member 16 such that it externally surrounds the bottom end portion of the tool holding member 16, together with the sealing member 31, by using a plurality of bolts or the like.

The cover 28 may be formed of an aluminum alloy to prevent damage due to attachment of a splash of a high-temperature melted metal or may be formed of a general-purpose synthetic resin, such as engineering plastics, which can be readily exchanged and has a light weight. Otherwise, the cover 28 may be formed with a fiber reinforced plastic (FRP) in order to prevent damage due to fatigue to be caused by vibration associated with high-speed rotation of the welding tool 4 or the like.

An end face 34 of guide portion 33, which is arranged to face the materials 2 to be welded, is in parallel with an imaginary plane which is perpendicular to the axis of barrel 32. The materials 2 to be welded are placed in parallel with an imaginary plane which is perpendicular to the axis of supporting member 21, while being supported by the rod-like support member 21. In addition, the axis of the support member 21 is aligned with the axis L2 of the welding tool 4.

In the state as described above, the guide portion 33 is spaced apart from the top face of the materials 2 to be welded, with a slight gap ΔL. The gap ΔL is selected from the range of from 1 to 3 mm. The axis of the barrel portion 32 extends coaxially with the axis L2 of the welding tool 4.

Between the lower end face 16a of the tool holding means 16 and the top face 2c (i.e., the top face of the upper steel plate 2a) of the materials 2 to be welded, an annular space S is defined by the cover 28. The space S is designed such that an inert gas is supplied therein from the nipple 29 at a flow rate of, for example, 25 litters/minutes, the internal pressure is maintained slightly higher than the atmospheric pressure, the ambience is filled with the inert gas while invasion of the air is prevented, so as to provide frictional stir welding to the welding portion 3 of the materials 2 to be welded by using the welding tool 4.

The inert gas to be supplied from the nipple 29 into the space S is introduced through the guide portion 33 in which the sectional area of flowing path is gradually decreased as compared with the section of the barrel portion 32, and then leaks in a quite small amount from the gap defined by the space ΔL between the cover 28 and the materials 2 to be welded. Thus, the space S in the cover 28, and in particular a region surrounding the welding tool 4, can be maintained in a state that is always filled with the inert gas. Therefore, as will be described later with reference to FIG. 4, the welding portion 3 can be blocked from the atmospheric air due to the inert gas, while the welding tool 4 is pressed with rotation against the materials 2 to be welded, with the surface of its base material 51 being covered with the coating 50, and the welding portion 3 is then softened by frictional heat to be generated between the welding tool 4 and the materials 2 to be welded, so as to provide solid phase welding to the welding portion 3 with its softened portion being stirred. Thus, degradation, damage and peeling of the oxidation welding tool 4 covered with the coating 50 can be prevented.

In the above embodiment, a construction in which the nipple 29 is provided at a point of a central portion of the cover 28 along the axial direction of the barrel 32 to be directed toward the axis L1 is illustrated. However, in another embodiment according to the present invention, the nipple 29 may be provided at a plurality of points, for example, two or three points, at an equal interval, around the circumference of the barrel 32, toward the axis L2, or may be provided at one to three points to be angled toward a space defined between the stirring rod 17 and the barrel 32, or otherwise may be provided at one to three points such an the inert gas is injected directly toward the welding portion 3 or welding tool 4.

In a still another embodiment according to the present invention, a nozzle may be used in place of the nipple 29. With use of such a nozzle, directivity can be further added to the direction of supplying the inert gas. In this way, the space surrounding the welding tool 4 can be changed into an atmosphere of the inert gas within a short time by injecting it from the nozzle 3 toward the welding portion 3 immediately before the start of friction stir, thus preventing a high-temperature portion being treated from contacting with the atmospheric air.

Figure 3:
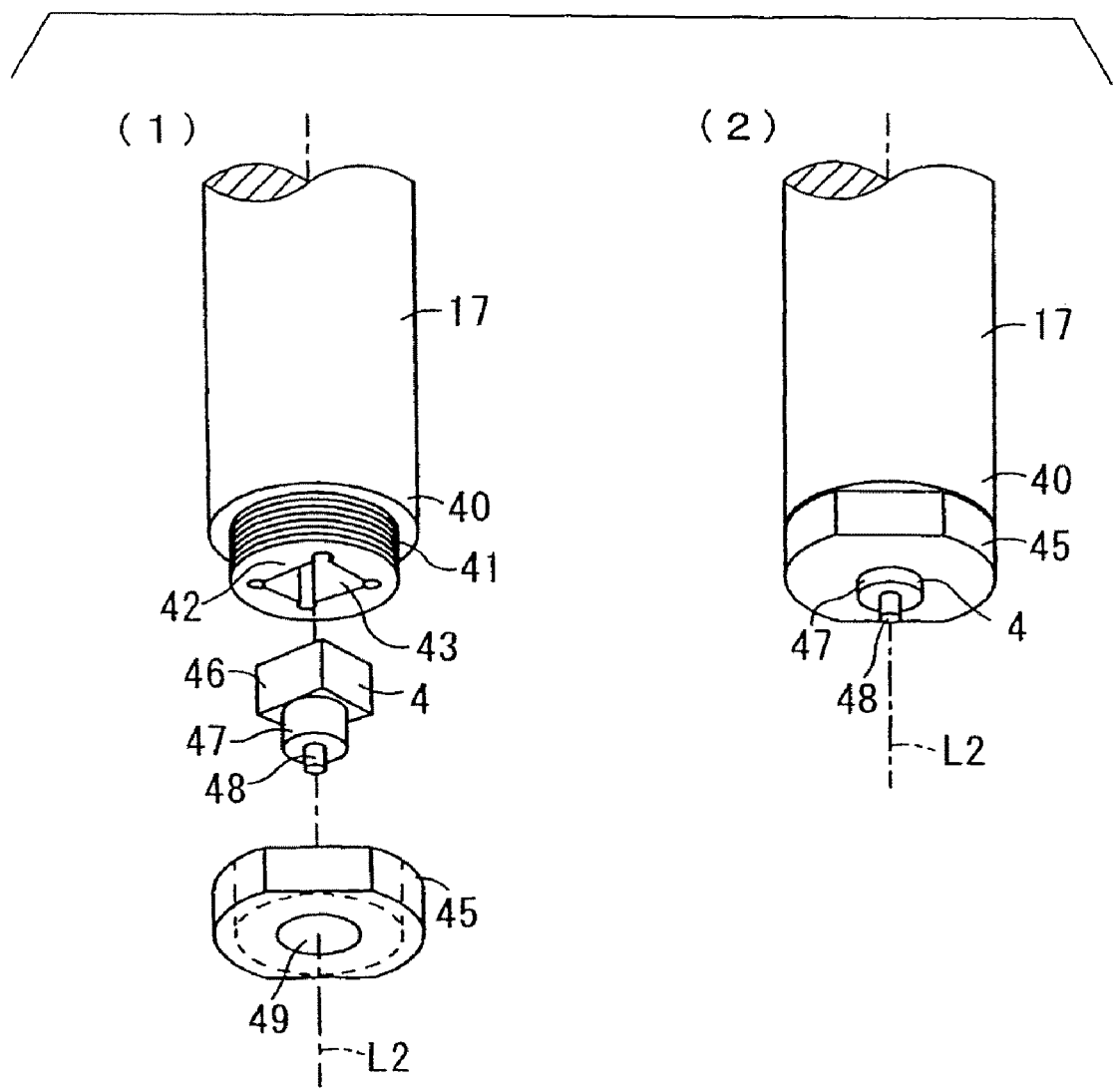
FIG. 3 includes perspective views respectively showing structures for attaching the welding tool 4 to a stirring rod 17, wherein FIG. 3(1) shows a state in which the welding tool 4 is separated from the stirring rod 17, and FIG. 3(2) shows a state in which the welding tool 4 is attached to the stirring rod 17.

FIG. 3 includes perspective views respectively showing structures for attaching the welding tool 4 to a stirring rod 17, wherein FIG. 3(1) shows a state in which the welding tool 4 is separated from the stirring rod 17, while FIG. 3(2) shows a state in which the welding tool 4 is attached to the stirring rod 17. The stirring rod 17 is formed into a cylindrical shape, and a fitting portion 42 around which external threads 41 are formed is provided at a bottom end portion 40. In the fitting portion 42, a fixing recess 43 is formed, in which the welding tool 4 is to be partially engaged. A fixing member 45 having internal threads 44, which are formed therein to be engaged with the external threads 41, is secured via threads to the fitting portion 42.

The external threads 41 and internal threads 44 are respectively formed such that they can be fastened together by rotating the fixing member 45 in the direction opposite to the rotational direction of the stirring rod 17 so as to prevent loosening of the fixing member 45 during the welding operation due to counter force which will be experienced by the welding tool 4 from the materials 2 to be welded and is generated in the direction opposite to the rotational direction. The fitting recess 43 is formed coaxially with the axis L2 of the stirring rod 17, and its section perpendicular to the axis L2 is designed to be a square so as to prevent accidental or unnecessary rotation during operation of the welding tool 4 fitted in the fitting recess 43.

The welding tool 4 includes a mounting portion 46, a shoulder portion 47, and a pin portion 48. The shoulder portion 47 is connected with the mounting portion 46, and the pin portion 48 is connected and formed integrally with the shoulder portion 47. The shoulder 47 and pin portion 48 are formed together into a cylindrical or conical shape, such that the diameter of the pin portion 48 is less than that of the shoulder portion 47. In this embodiment, the shoulder portion 47 and pin portion 48 are formed coaxially with each other, while in another embodiment, the pin portion 48 may be formed on an axis which is eccentric to the shoulder portion 47.

The mounting portion 46 is formed such that it can be loosely fitted in the fitting recess 43 of the stirring rod 17. The shape of the mounting portion 46 is formed into a generally rectangular parallelepiped with a square section which is vertical to the axis L2, correspondingly to the generally rectangular parallelepiped space formed in the fitting recess 43. The dimensions of the shoulder portion 47 and pin portion 48 in the diametrical and axial directions are respectively set at optimal ones in advance in view of properties of the materials to be welded, welding conditions, welding strength and shape after welded. For example, the diameter of the shoulder portion 47 is set at 10 mm, and the diameter of the pin portion 48 is determined at 4 mm.

In the state where the mounting portion 46 is loosely fitted in the fitting recess 43, as shown in FIG. 3(2), the shoulder portion 47 projects partially from the stirring rod 17, and the pin portion 48 projects in turn from the shoulder portion 47.

The fixing member 45 is formed detachably to the distal end 40 of the stirring rod 17. In the fixing member 45, a through hole 49 is formed, from which a part of the shoulder portion 47 and the pin portion 48 of the welding tool 4 are projected. In this way, four corners of the circumference of the shoulder portion 47 of the mounting portion 46 are held by the fixing member 45, thus the welding tool 4 is attached at the bottom end portion of the stirring rod 17.

In the state where the welding tool 4 is attached to the stirring rod 17, since the mounting portion 46 and the fitting recess 43 are respectively formed into a rectangular parallelepiped, even if the welding tool 4 experiences a substantially great counter force in the direction reverse to the rotational direction from the materials 2 to be welded during the welding operation, angular displacement of the welding tool 4 about the axis L2 of the stirring rod 17 can be prevented. In addition, since the welding tool 4 is held at the bottom end portion of the stirring rod 17 with the fixing means 45, if the welding tool 4 is worn up, it can be exchanged with a new welding tool 4 by disengaging the fixing means 45 from the threads of the stirring rod 17.

The welding tool 4 is formed from a material mainly consisting of silicon nitride ($Si_3N_4$), in which the mounting portion 46, shoulder portion 47 and pin portion 48 are integrally formed by sintering, and the coating 50 is formed on the surfaces of these portions as will be described below. The stirring rod 17 and the fixing means 45 are formed of, for example, tool steel, such as SKD-61.

Figure 4:
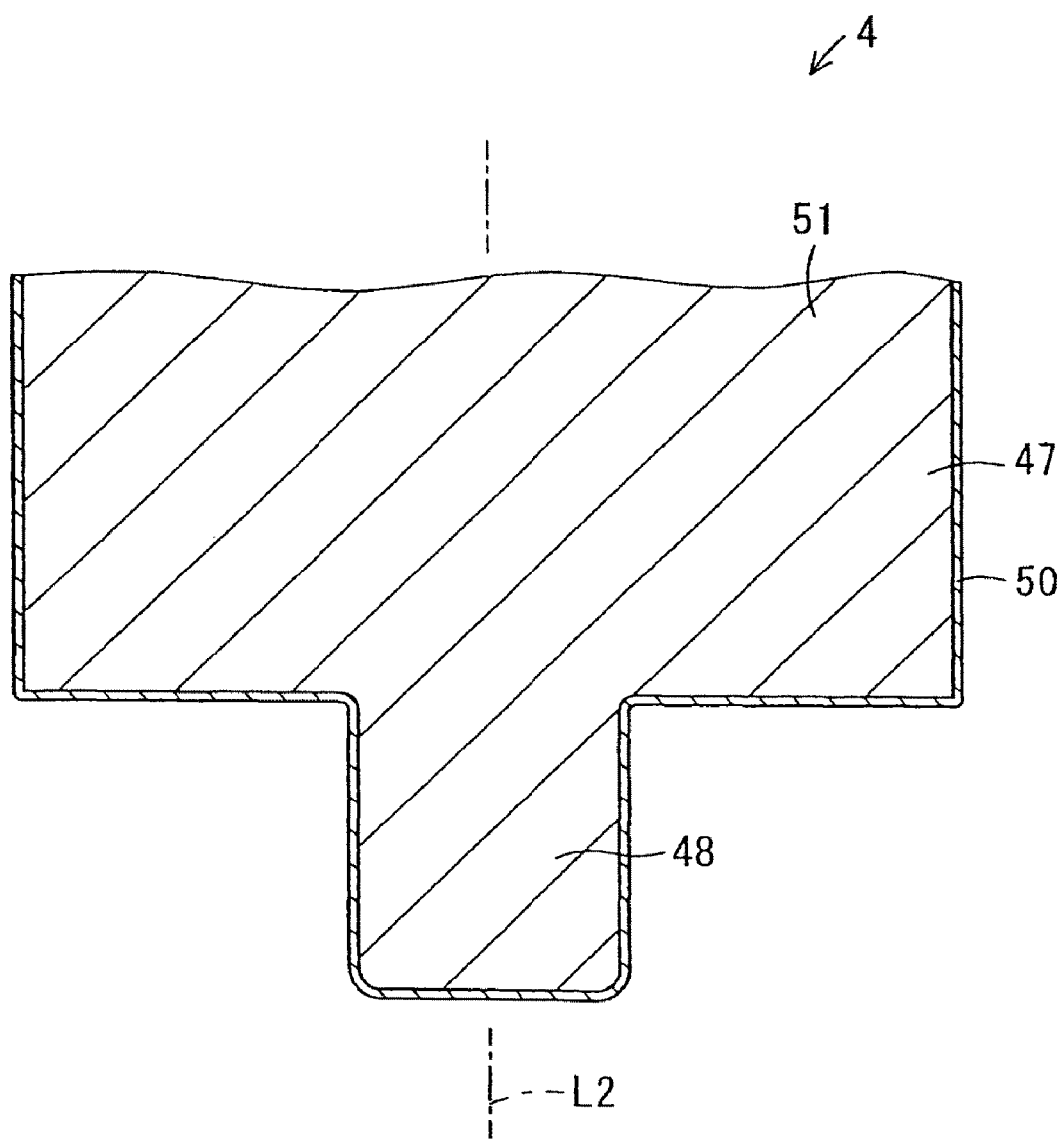
FIG. 4 is a partially enlarged view of the welding tool 4.

FIG. 4 is a partially enlarged view of the welding tool 4. The coating 50 consisting of aluminum nitride (AlN) which is a material having a wear resistance higher than that of the materials 2 to be welded is formed on the whole surface including at least the shoulder portion 47 and pin portion 48 in the welding tool 4, corresponding to at least a region to be in contact with the materials 2 to be welded. The base material 51 on which the coating 50 is formed is made from a hard material mainly consisting of silicon nitride as described above, wherein the coating 50 is formed on the surface of the material 51 by using the chemical vapor deposition (CVD), physical vapor deposition (PVD) or thermal spraying. The thickness $\Delta T$ of the coating 50 is, for example, 1 μm to 20 μm.

The aluminum nitride described above is a material having a thermal conductivity of 170 to 180 W/m·k, a coefficient of thermal expansion of $5 \times 10^{-6}/°C.$, and a Moh's hardness of 9, which does not exhibit any chemical reaction with the steel materials used as the materials 2 to be welded even under high temperature conditions and can be used as the material in a quite small amount. Next, a method of forming the coating 50 on the surface of the welding tool 4 will be described.

Figure 5:
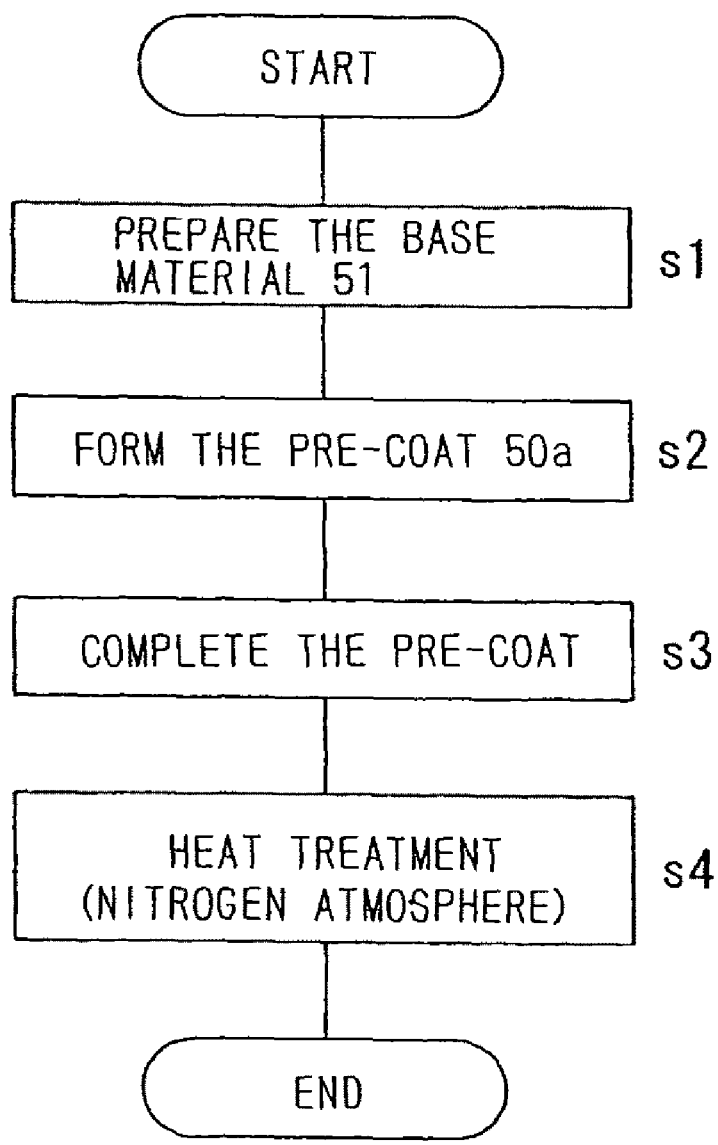
FIG. 5 is a flow chart for explaining a method of forming the welding tool 4 having a coating 50 thereon.
Figure 6:
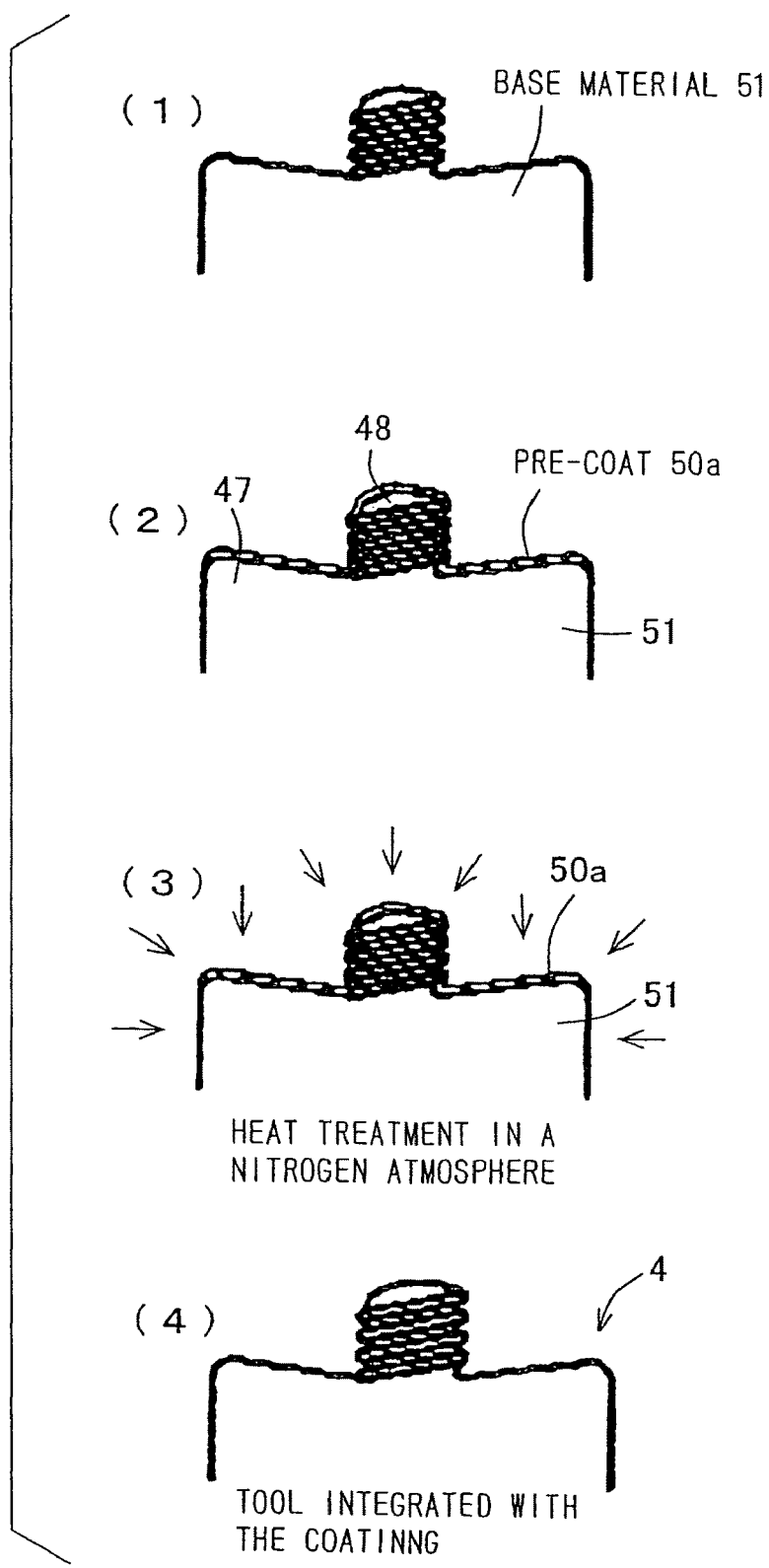
FIG. 6 includes schematic views showing each step for preparing the welding tool 4 having the coating 50 integrally formed on its surface, wherein FIG. 6(1) shows a base material 51 on which the coating 50 is to be formed, FIG. 6(2) shows a state in which a pre-coat 50a is formed on the base material 51, FIG. 6(3) shows a state in which the pre-coat 50a is integrated with the base material 51 by a heat treatment.

FIG. 5 is a flow chart for explaining a method of forming the welding tool 4 having a coating 50 thereon. FIG. 6 includes schematic views showing each step for preparing the welding tool 4 having the coating 50 integrally formed on its surface, wherein FIG. 6(1) shows a base material 51 on which the coating 50 is to be formed, FIG. 6(2) shows a state in which a pre-coat 50a is formed on the base material 51, FIG. 6(3) shows a state in which the pre-coat 50a is integrated with the base material 51 by a heat treatment, and FIG. 6(4) shows a state in which the welding tool 4 is completed after full integration of the pre-coat 50a with the base material 51.

First, in Step 1, as shown in FIG. 6(1), the base material 51 for the welding tool 4 consisting of silicon nitride is prepared, and in Step 2, the pre-coat 50a consisting of an aluminum-based material is formed, as shown in FIG. 6(2), on the surface of the pin portion 48 and shoulder portion 47 of the base material 51. As the aluminum-based material, pure aluminum or an aluminum alloy may be used.

As the method of forming the pre-coat 50a, powder of the aluminum-based material may be coated on the welding tool 4, or the welding tool 4 may be covered with an aluminum foil. Otherwise, the pre-coat may be formed on the surface of the tool 4 by press fitting of the tool 4 with rotation into an aluminum-based material.

In this way, once the pre-coating process is completed by forming the pre-coat 50a on the surface of the base material 51 consisting of silicon nitride ($Si_3N_4$) in Step 3, the base material 51 having the pre-coat formed thereon is then subjected to a heat treatment in a nitrogen atmosphere under a normal pressure or pressurized condition in Step 4, so as to form the coating 50 consisting of aluminum nitride (AlN) as shown in FIG. 6(3). At the same time, the coating 50 and the base material 51 are integrated by diffusion, thus the welding tool 4 is completed, during which the base material 51 and the coating 50 are fully integrated, in the Step 4, as shown in FIG. 6(4).

Figure 7:
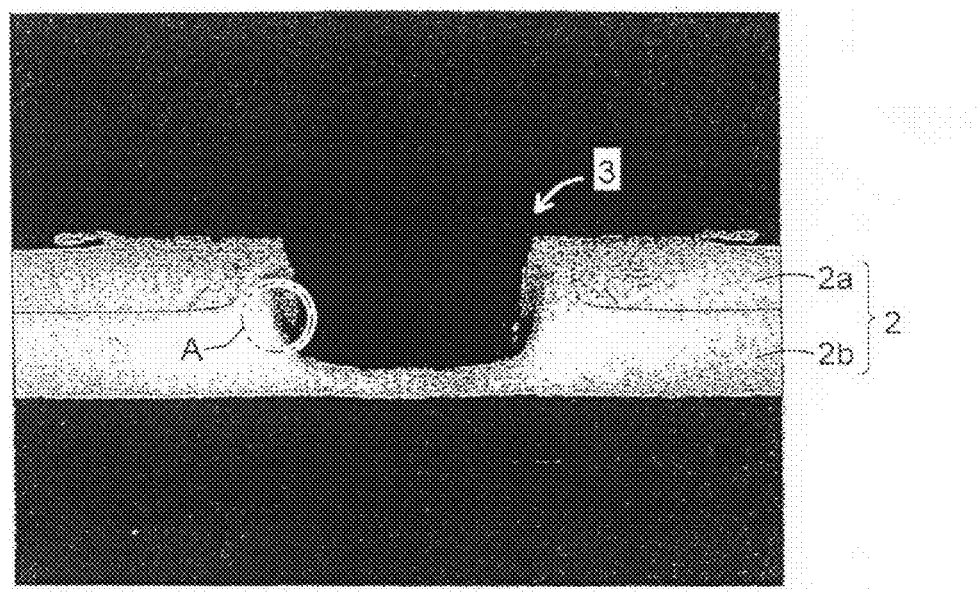
FIG. 7 is a photograph of an optical microscope showing a welded state of a welding portion 3 wherein friction stir spot welding is performed for two sheets of steel plates 2a, 2b by using the welding tool 4 on which the coating 50 is not formed.

FIG. 7 is a photograph of an optical microscope showing a welded state of a welding portion 3 wherein friction stir spot welding is performed for two sheets of steel plates 2a, 2b by using the welding tool 4 on which the coating 50 is not formed. In the drawing, a section A depicts a region including a section having been subjected to friction stir, which is formed by the pin of the tool 4.

Figure 8:
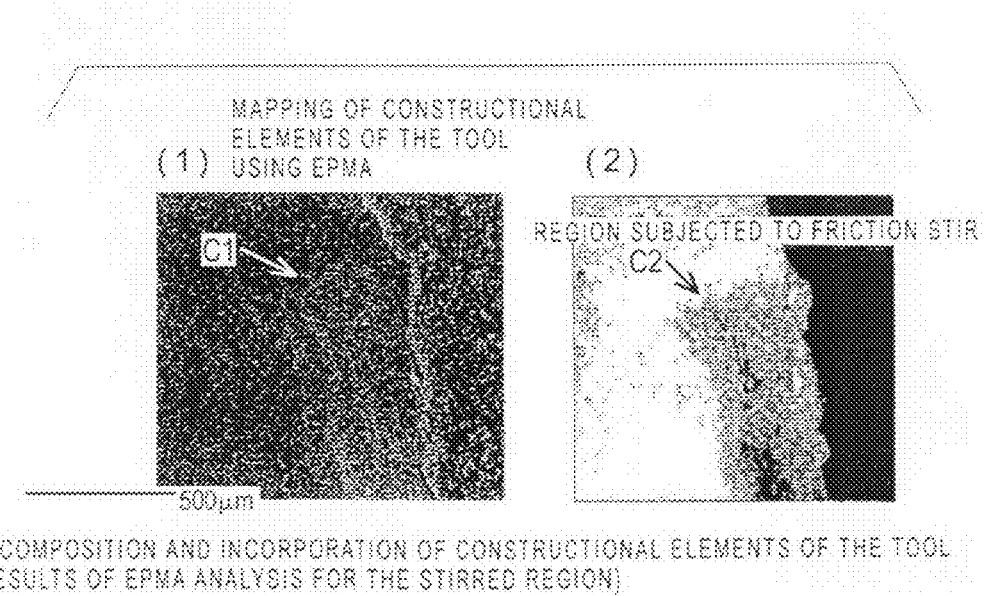
FIG. 8 shows results of analysis for constructional elements of the welding tool for the section A in FIG. 7, using an Electron Probe Micro Analyzer (EPMA), wherein FIG. 8(2) shows a state in which the section A in FIG. 7 is appropriately enlarged, and FIG. 8(1) shows a result of mapping for silicon, in the region corresponding to FIG. 8(2), based on the EPMA analysis.

FIG. 8 shows results of analysis for constructional elements of the welding tool for the section A in FIG. 7, using an Electron Probe Micro Analyzer (EPMA), wherein FIG. 8(2) shows a state in which the section A in FIG. 7 is appropriately enlarged, and FIG. 8(1) shows a result of mapping for silicon, in the region corresponding to FIG. 8(2), based on the EPMA analysis. Corresponding to the region having been subjected to the friction stir, which is expressed by C2 in FIG. 8(2), existence of silicon (white points) can be recognized in the region depicted by C1 in FIG. 8(1). Accordingly, it can be seen that when using the welding tool 4 with no coating 50 formed thereon, $Si_3N_4$, the component of the base material 51 of the welding tool 4, will be incorporated into the region having been subjected to the friction stir in the welded materials 2.

Figure 9:
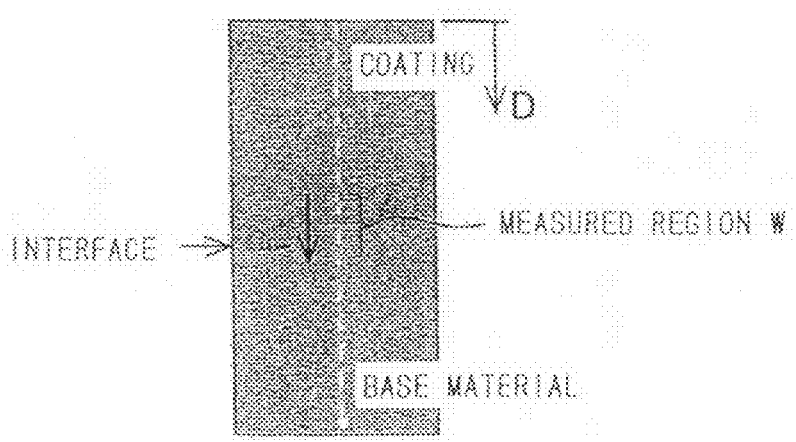
FIG. 9 is an enlarged photograph showing a sectional image in the vicinity of an interface between the base material 51 and the coating 50 of the welding tool 4 after a heat treatment.
Figure 10:
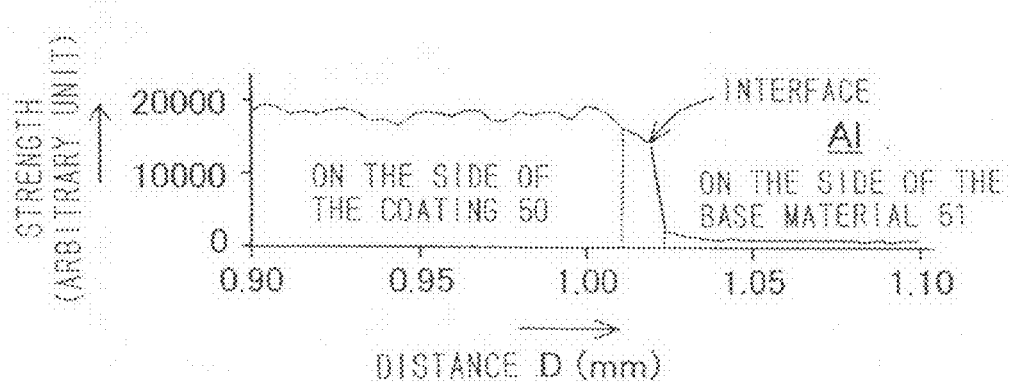
FIG. 10 is a graph showing a result of linear analysis obtained by the EPMA for aluminum (Al) in the interface between the base material 51 and the coating 50.
Figure 11:
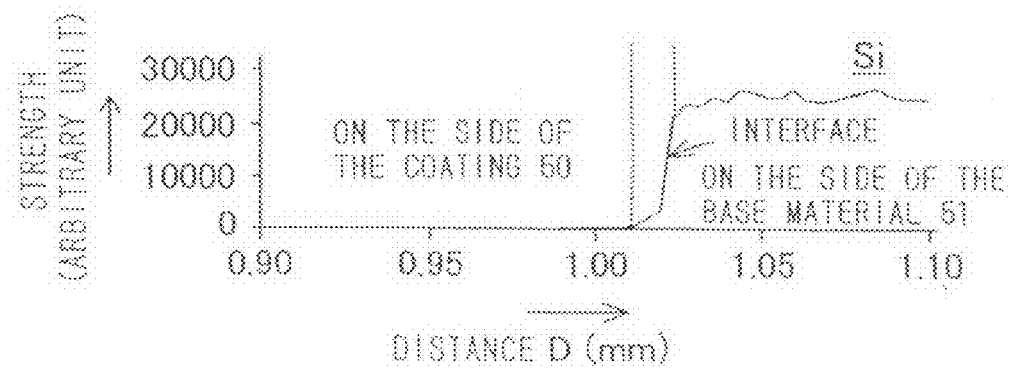
FIG. 11 is a graph showing a result of linear analysis obtained by the EPMA for nitrogen (N) in the interface between the base material 51 and the coating 50 of the welding tool 4.

FIG. 9 is an enlarged photograph showing a sectional image in the vicinity of an interface between the base material 51 and coating 50 of the welding tool 4 after the heat treatment, FIG. 10 is a graph showing a result of linear analysis obtained by the EPMA for aluminum (Al) in the interface between the base material 51 and the coating 50, and FIG. 11 shows a result of linear analysis obtained by the EPMA for Al and silicon (Si) in the vicinity of the interface between the base material 51 and coating 50 of the welding tool 4. In FIGS. 10 and 11, the vertical axis expresses the measuring strength while the horizontal axis designates the distance D in the measuring range W of a sample.

As apparently seen from FIGS. 10 and 11, the curves respectively expressing the compositions, i.e., aluminum (Al) and silicon (Si), are linearly and gradually changed in the vicinity of the interface, thus the atoms of aluminum (Al) and silicon (Si) are mutually diffused so that the base material 51 and the coating 50 are integrated across the interface.

Figure 12:
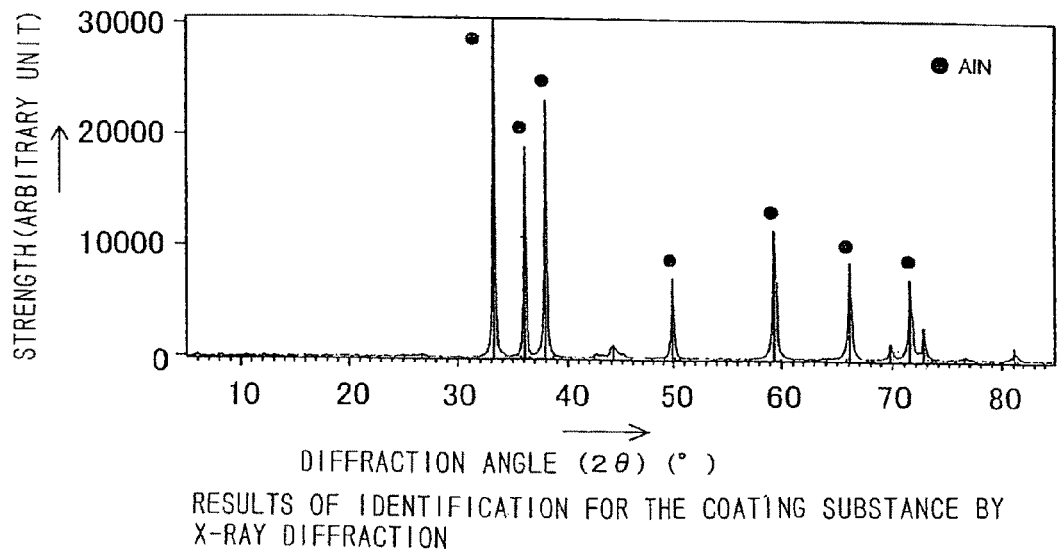
FIG. 12 is a graph showing a result of X-ray diffraction for the coating 50.

FIG. 12 is a graph showing a result of X-ray diffraction for the coating 50. In this graph, the vertical axis is strength (arbitrary unit) of the X-ray diffraction while the horizontal axis expresses the diffraction angle (2θ). In this graph, a plurality of peaks respectively expressing greater strength of the X-ray diffraction for aluminum nitride (AlN) demonstrate that the main component of the coating 50 consists of aluminum nitride (AlN).

Figure 13:
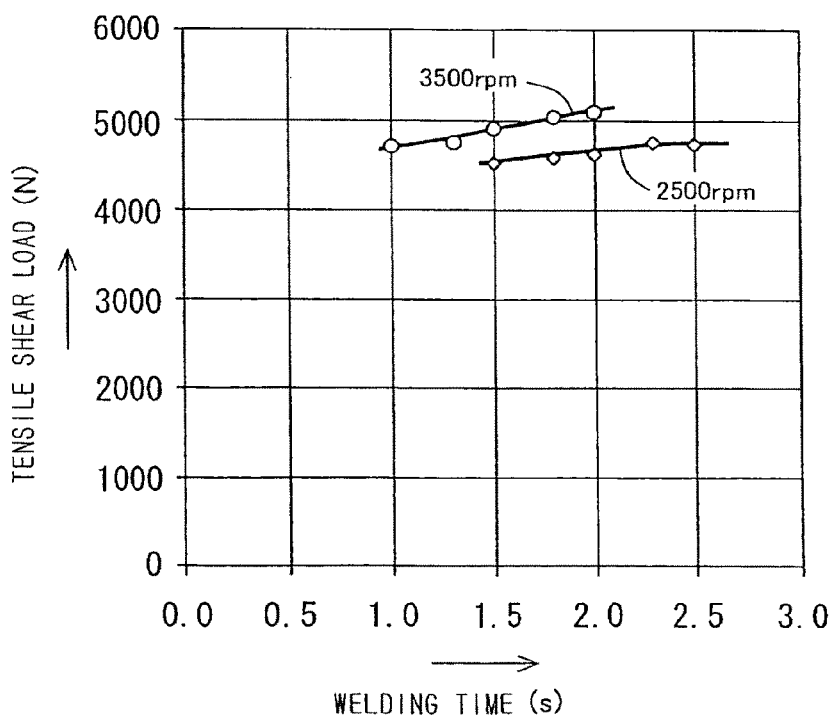
FIG. 13 is a graph showing a relationship between the welding time and the tensile shear strength in the case of providing friction stir welding to materials 2 to be welded, by using the welding tool 4 having the coating 50 formed thereon.

FIG. 13 is a graph showing a relationship between the welding time and the tensile shear strength in the case of providing friction stir welding by using the welding tool 4 having the coating 50 formed thereon to the materials 2 to be welded. The welded materials 2 which have been subjected to friction stir spot welding under the conditions of high speed rotation of the welding tool 4 rotated at speeds of 2500 rpm and 3500 rpm and the welding time ranging from 1.0 second to 2.5 seconds were prepared as test pieces. The test piece prepared by welding at the rotational speed of 2500 rpm was broken when applied with a tensile shear load of about 4500N to about 4700N, while the test piece prepared by welding at the rotational speed of 3500 rpm was broken when applied with a tensile shear load of about 4700N to 5150N.

Since the coating 50 consisting of aluminum nitride (AlN) is formed on the welding tool 4, the rotational speed of the welding tool 4 can be elevated up to the range of from 2500 rpm to 3500 rpm. In addition, it is found that the tensile shear strength of the welded materials 2 can also be enhanced by such increase of the rotational speed of the welding tool 4.

Figure 14A:
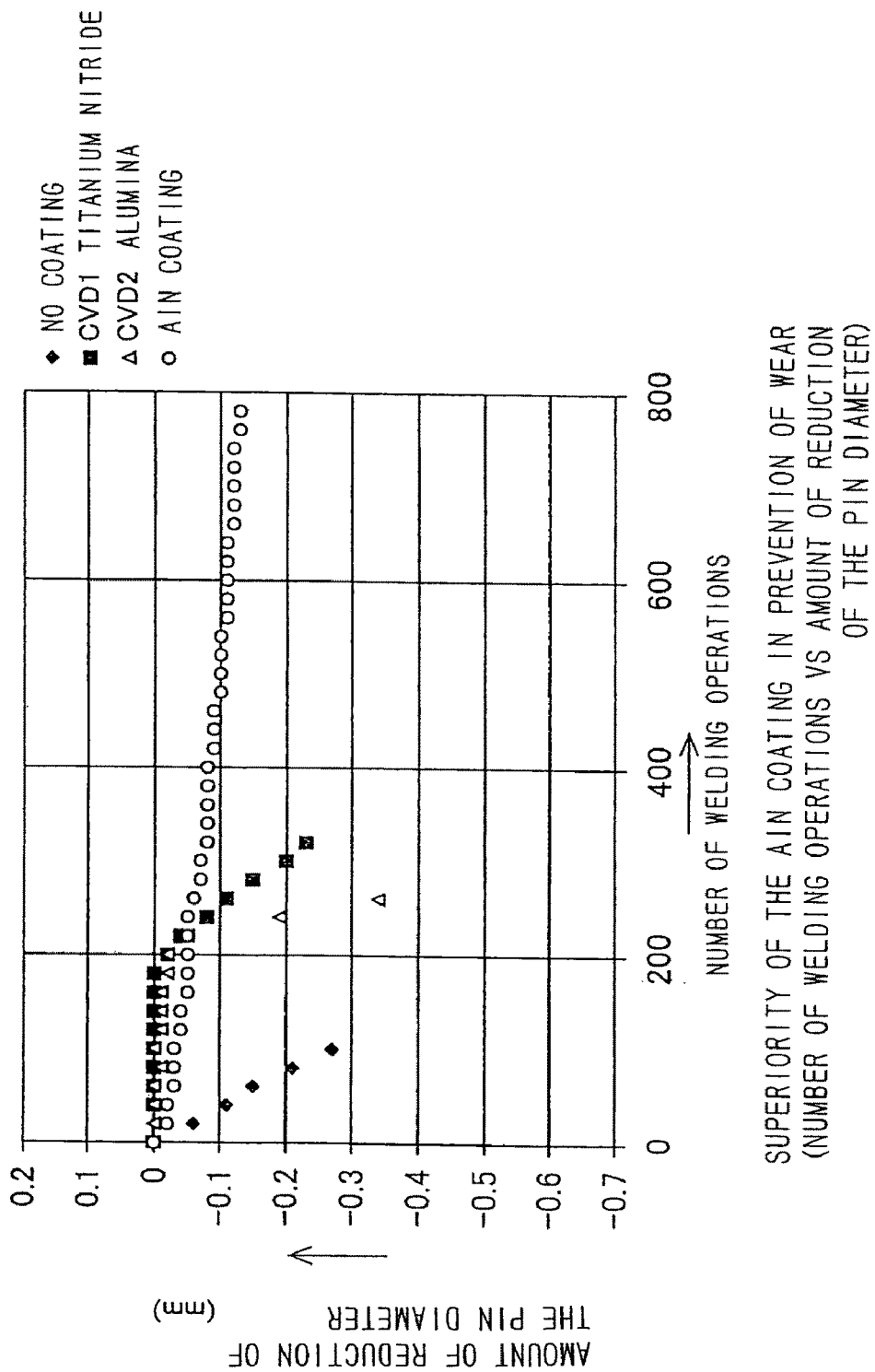
FIGS. 14A and 14B are graphs showing a relationship between the number of welding operations upon the friction stir welding and the diameter of the pin portion 48.
Figure 14B:
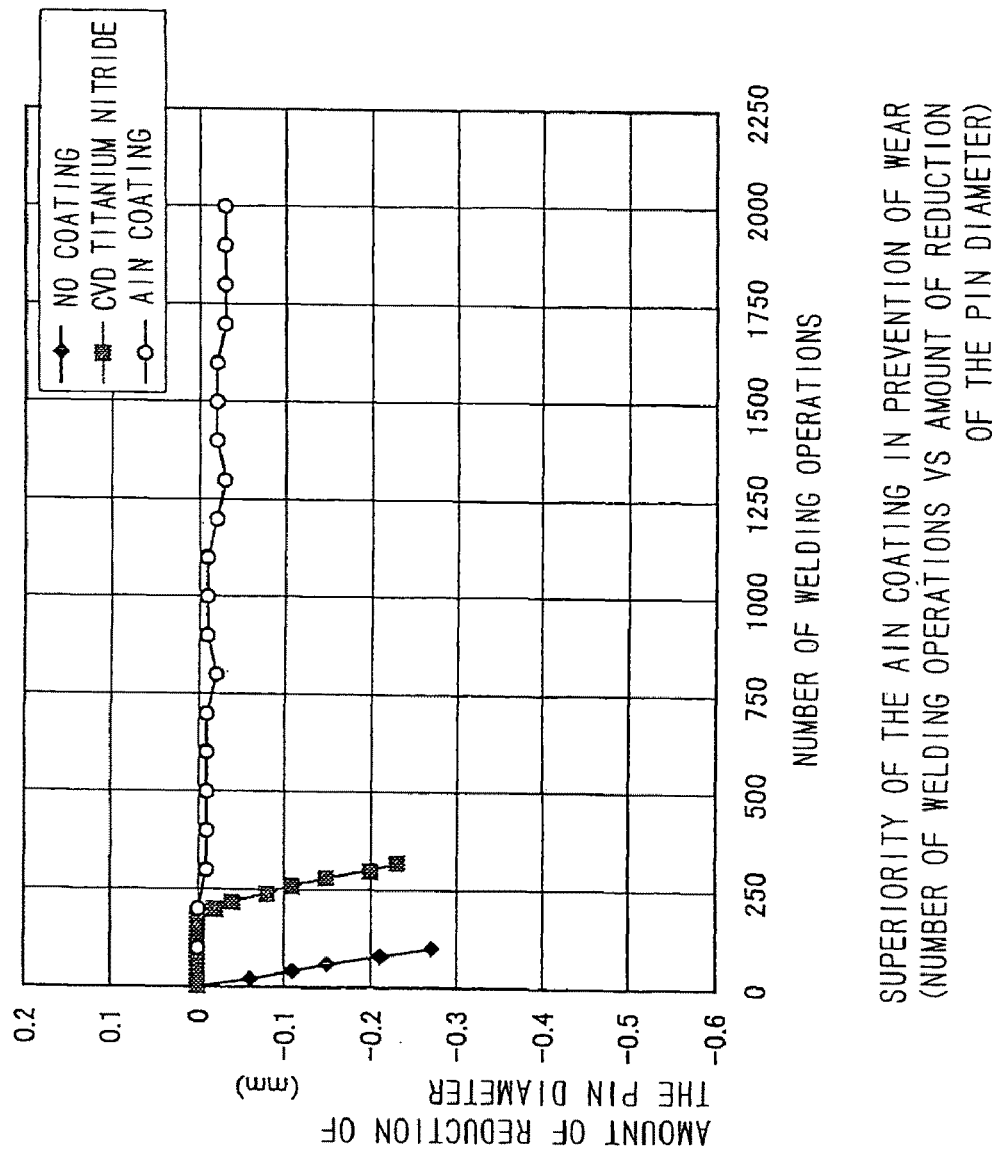

FIGS. 14A and 14B are graphs showing a relationship between the number of welding operations during the friction stir welding and the amount of reduction of the diameter of the pin portion 48. In the same drawing, the amount of reduction of the diameter of the welding tool 4 on which the coating 50 is not formed is designated by symbol "♦", the amount of reduction of the diameter of the welding tool 4 on which the coating 50 of titanium nitride is formed is depicted by symbol "■", the amount of reduction of the diameter of the welding tool 4 on which the coating 50 of alumina is formed is designated by symbol "△", and the amount of reduction of the diameter of the welding tool 4 on which the coating 50 of aluminum nitride is formed is depicted by symbol "○".

As apparently seen from FIG. 14A, the welding tool 4 on which the coating 50 consisting of aluminum nitride (AlN) is formed demonstrates that drastic wear of the pin portion 48 does not occur at least within the range of the number of welding operations from 0 to 800 as compared with the case in which the coating 50 is not formed, the case in which the coating 50 consisting of titanium nitride (TiN), and the case in which the coating 50 consisting of alumina is formed.

Moreover, as apparently seen from FIG. 14B, even when the number of welding operations exceeds 800 and reaches 2000, drastic wear of the pin portion 48 still does not occur, and the rate of wear of the pin portion 48 is still lower than those of the other cases.

Accordingly, by forming the coating 50 consisting of aluminum nitride (AlN) on the welding tool 4, the wear resistance can be enhanced, higher rotational speed of the welding tool 4 can be achieved, and incorporation of the constructional elements of the welding tool 4 into the welded site can be prevented as well as higher strength of welding can be achieved. In the case of repeating spot welding, a situation that the temperature of the welding tool 4 rises upon welding and is then lowered during its transfer to a next welding portion 3 is repeated. Therefore, change in the temperature of the welding tool 4 is significantly large. In this regard, since the welding tool 4 of this embodiment has a superior heat and impact resistance as described above, it can endure a considerably drastic temperature change, thus maintaining strength required as a welding tool even upon repetition of spot welding to a relatively great number of welding portions 3.

For friction stir welding, the pin portion 48 can be advanced into each welding portion 3 while being rotated at a high speed, a greater region of friction stir in the welding portion 3 can be formed, thereby enhancing the strength of welding.

Figure 15:
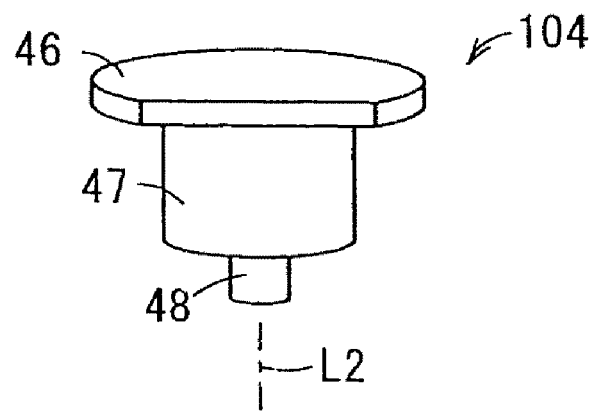
FIG. 15 is a perspective view showing a welding tool 104 of another embodiment according to the present invention.

FIG. 15 is a perspective view showing a welding tool 104 of another embodiment according to the present invention. The welding tool 104 also includes the shoulder portion 47 and the pin portion 48, which are similar to those of the welding tool 4 described in the previous embodiment, while this tool 104 is different in the shape of the mounting portion 46. Accordingly, the explanation for the shoulder portion 47 and the pin portion 48 is omitted in the description of this embodiment, and they are merely designated by the same reference numerals, respectively.

In the welding tool 104 of this embodiment, the mounting portion 46 is formed into a plate and has a generally elliptical section which is vertical to the axis L2. The fitting recess 43 in which the mounting portion 46 is to be fitted is formed into a space having a generally elliptical section which corresponds to the shape of the mounting portion 46, so that the mounting portion 46 can be loosely fitted therein. Thus, in the state where the mounting portion 46 is fitted in the fitting recess 43, angular displacement of the welding tool 104 about the axis L2 of the stirring rod 17 can be prevented. In addition, by arranging the fixing member 45 to make it abut one end face in the axial direction of the mounting portion 46 such that both end faces of the mounting portion 46 are interposed between the fixing member 45 and the stirring rod 17, displacement of the welding tool 104 in the axial direction can also be prevented, thus providing an effect similar to that of the welding tool 4 of the first embodiment shown in FIG. 1. The mounting portion 46 has a sectional shape which is larger than that of the shoulder portion 47. Thus, if sufficiently large pressing force can be provided from the welding tool 104 to the stirring rod 17 via the fixing member 45, the sectional shape of the mounting portion 46 may be formed into a circular shape. Due to such sufficiently large pressing force, the welding tool 104 can resist the rotational counter force to be generated upon contact with the materials 2 to be welded, as such preventing any slip of the welding tool 104 about the axis L2 and achieving integral rotation of the welding tool 104 with the stirring rod 17.

Even if the pressing force of the welding tool 104 against the stirring rod 17 due to the fixing member 45 is relatively small, it can be compensated by forming the sectional shape of the mounting portion 46 vertical to the axis L2 such that the distance from the center from which the axis L2 extends to the outer periphery of the mounting portion 46 will change along the circumferential direction, such as, for example, polygons or ellipses. Alternatively, as shown in FIGS. 17 to 21, concavo-convex portions may be provided to the fixing member 45. In this way, the welding tool 104 can resist the rotational counter force to be generated upon its contact with the materials 2 to be welded, and slipping of the welding tool 104 relative to the stirring rod 17 can be prevented, as such the welding tool 104 can be rotated integrally with the stirring rod 17.

Figure 16:
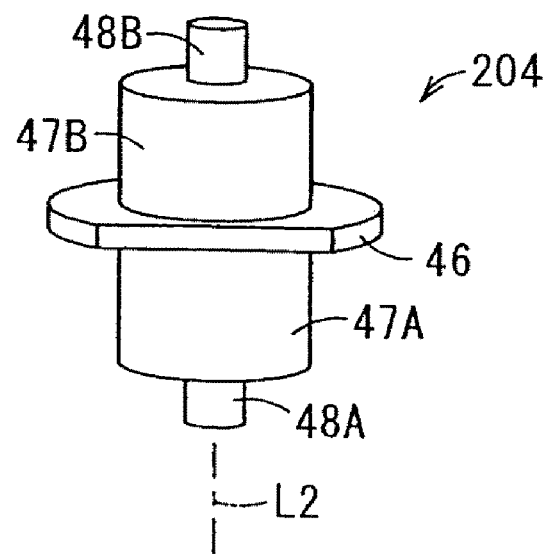
FIG. 16 is a perspective view showing a welding tool 204 of still another embodiment according to the present invention.

FIG. 16 is a perspective view showing a welding tool 204 of still another embodiment according to the present invention. The welding tool 204 is formed by respectively connecting a plurality of shoulder portions 47A, 47B, 48A, 48B, integrally with one another and coaxially with the axis L2, on both sides of the mounting portion 46. More specifically, in the welding tool 204, the first shoulder portion 47A projects from one side in the axial direction of the mounting portion 46, while the second shoulder portion 47B projects oppositely from the other side in the axial direction. Furthermore, the first pin portion 48A projects from an end face of the first shoulder portion 47A, while the second pin portion 48B projects from an end face of the second shoulder portion 47B. Because of similarity in the shapes of the respective shoulder portions 47A, 47B and the respective pin portions 48A, 48B to those of the welding tool 4 described above, the description for those parts is omitted here.

The fitting recess 32 of the stirring rod 17 of this third embodiment is formed into a shape in which the mounting portion 46 can be loosely fitted. The second shoulder portion 47B and second pin portion 48B are formed such that they can be received in the fitting recess 32, while the mounting portion 46 is fitted in the fitting recess 32 and the first shoulder portion 47A and first pin portion 48A project from the stirring rod 17. Namely, the fitting recess 32 is formed to include a fitting region in which the mounting portion 46 is to be fitted and a receiving region for receiving either one of the pairs of the shoulder portions 47 and pin portions 48.

By forming the receiving region to have a sectional shape smaller than that of the fitting region, when the welding tool 204 is fitted in the fitting recess 32, the portion of the welding tool 204 fitted therein will abut an end face of the mounting portion 46. In this state, both end faces of the mounting portion 46 are interposed between the fixing member 45 and the stirring rod 17. In this way, the welding tool 204 can be fixed relative to the stirring rod 17, thus obtaining the same effect as described in the previous embodiment.

Even if either the first shoulder 47A or first ping portion 48A wears, the welding tool 204 can be further used by turning it around and then reattaching it to the stirring rod 17. Namely, in such a reattached state, the mounting portion 46 is fitted in the fitting recess 32, while the second shoulder portion 47B and second pin portion 48B project from the stirring rod 17, and the first shoulder portion 47A and first pin portion 48A are received in the fitting recess 32. Thus, in this embodiment, the tool exchanging work upon wear of the tool can be facilitated and the maintenance property can be enhanced, as compared with the welding tool including the pin portion and shoulder portion only on its one side.

Figure 17:
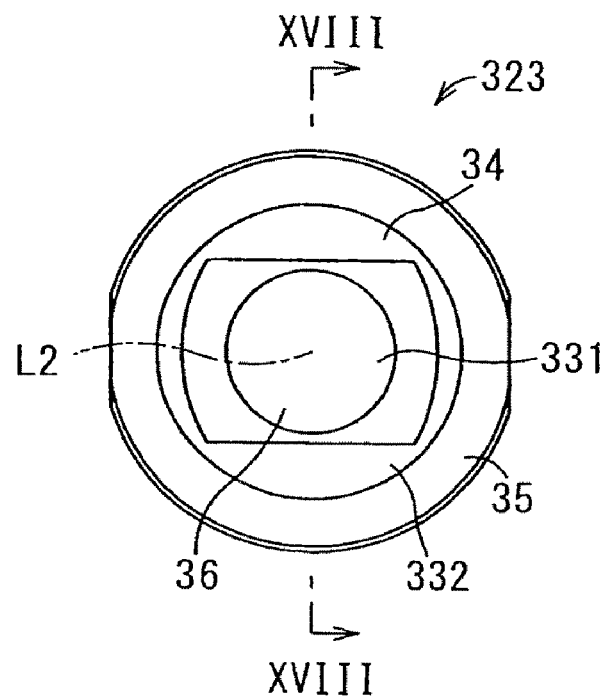
FIG. 17 is a plan view showing a fixing member 323 of yet another embodiment according to the present invention.
Figure 18:
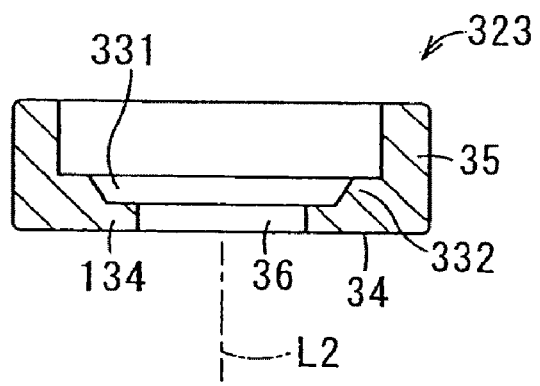
FIG. 18 is a section taken along line XVIII-XVIII of FIG. 17.

FIG. 17 is a plan view showing a fixing member 323 of yet another embodiment according to the present invention, and FIG. 18 is a section taken along line XVIII-XVIII of FIG. 17. In this embodiment, the fixing member 323 used is different from the fixing member 45 shown in FIG. 1 and is described below with assumption that the welding tool 104 shown in FIG. 15 is fixed to the stirring rod 17. In the fixing member 323, a fitting recess 331 in which the mounting portion 46 of the welding tool 104 is to be fitted is formed. Namely, a means for preventing angular displacement of the welding tool 104 is provided on the side of the fitting member 323. Since the fitting member 323 has the same construction as that of the fitting member 45 in the previously described embodiment except that the fitting recess 332 is formed therein, descriptions for like parts will be omitted here, and the same reference numerals as those in the fixing member 45 of the previous embodiment are assigned thereto, respectively. Additionally, in this embodiment, the fitting recess 43 is not provided in the stirring rod 17, and the end face of the bottom end portion 40 is thus formed flat.

Specifically, with an end wall 134 of the fixing member 323, the fitting portion 332 is formed integrally, which includes a truncated conical fitting recess 331 near its outer periphery around which a circumferential wall 135 is raised. To the fitting portion 332, an end face of the mounting portion 46 of the welding tool 104 will abut as well as the outer periphery of the mounting portion 46 will be in contact. As a result, the mounting portion 46 is loosely fitted in the fitting recess 331, thus the angular displacement about the axis L2 relative to the fixing member 323 can be prevented in the fitted state. In this state, the fixing member 323 is secured to the stirring rods 17 via threads, such that the welding tool 104 can be fixed detachably to the stirring rod 17.

Moreover, by forming a recess in the stirring rod 17, in which the shoulder portion 47 and pin portion 48 can be loosely fitted, the welding tool 204 shown in FIG. 16 can also be fixed in the stirring rod 17. As such, also by utilizing the fixing member 323 of this embodiment, the same effect as that in the respective previous embodiments can be obtained. Furthermore, in this embodiment, various mounting portions 46 having different shapes can be applied only by preparing fixing members respectively having fitting recesses 331 each corresponding to the shape of each mounting portion 46. Thus, there is no need to alter the shape of the stirring rod 17 based on the shape of the mounting portion 46. Accordingly, a plurality of welding tools including mounting portions 46 respectively having different shapes can be fixed to the stirring rod 17 as desired.

Figure 19:
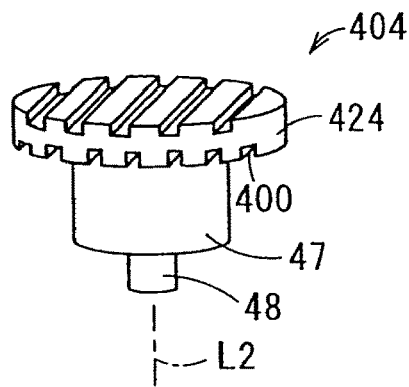
FIG. 19 is a perspective view showing a welding tool 404 of still another embodiment according to the present invention.
Figure 20:
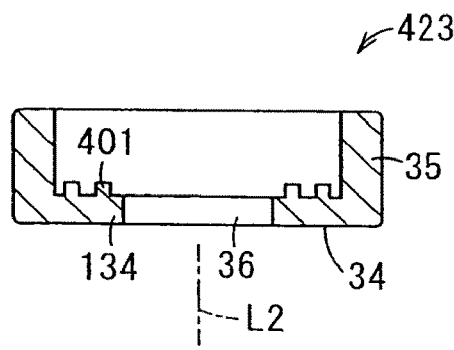
FIG. 20 is a section showing a fixing member 423 of yet another embodiment according to the present invention.

FIG. 19 is a perspective view showing a welding tool 404 of still another embodiment according to the present invention, and FIG. 20 is a section showing a fixing member 423 of yet another embodiment. The welding tool 404 also includes the shoulder portion 47 and the pin portion 48, which are similar to those of the welding tool 4 described in the first embodiment, while this tool 404 is different in the shape of its mounting portion 424. Accordingly, the explanation for the shoulder portion 47 and the pin portion 48 is omitted in the description of this embodiment, and they are merely designated by the same reference numerals, respectively.

The mounting portion 424 is formed into a generally disk-like shape, and is arranged coaxially with the shoulder portion 47. The mounting portion 424 has concavo-convex portions 400 formed in its one end face, which will be in contact with at least either one of the fixing members 45, 323 and stirring rod 17. The concavo-convex portions 400 may be formed into any one of a rough-surfaced shape, a spline shape, an ant-groove shape and a saw-tooth shape. The mounting portion 424 is interposed and held between the mounting portion 45 or 323 and the stirring rod 17. By forming the concavo-convex portions 400 in an end face opposite to the shoulder portion 47 of the mounting portion 424 in parallel to the diametrical line which is perpendicular to the axis L2, angular displacement of the welding tool 404 about the axis L2 relative to the stirring rod 17 can be prevented, and the welding tool 104 can resist the rotational counter force to be generated from the materials 2 to be welded during the friction stir.

Similarly, at least either one of the fixing member 423 and the stirring rod 17 includes concavo-convex portions 401 formed in an end face to be in contact with the mounting portion 424 in parallel with the diametrical line which is perpendicular to the axis L2. Due to engagement of these concavo-convex portions 401 with the concavo-convex portions 400 formed in the welding tool, angular displacement of the welding tool 404 relative to the stirring rod 17 can be securely prevented. Such a portion adapted to prevent the angular displacement of the welding tool 404 may be provided in either one of end faces of the mounting portion 524. The sectional shape of the mounting portion 524 may be one other than the circular shape, including, for example, an elliptical or oblong shape.

Figure 21:
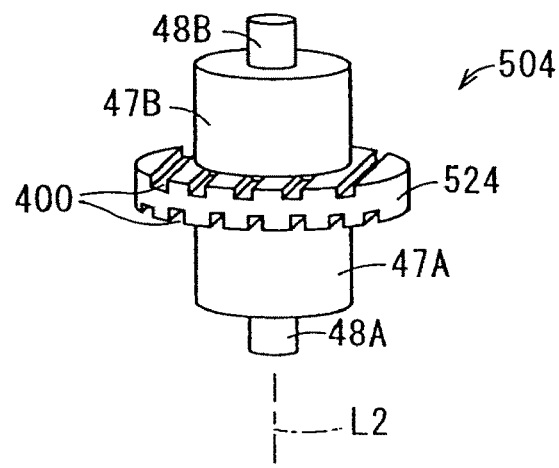
FIG. 21 is a perspective view showing a welding tool 504 of still another embodiment according to the present invention.

FIG. 21 is a perspective view showing a welding tool 504 of still another embodiment according to the present invention. Also in the welding tool 504 of this embodiment, the shoulder portions 47A, 47B and the pin portions 48A, 48B are formed on each side of a mounting portion 524 as with the aforementioned welding tool 204 shown in FIG. 16. Namely, also in the case of employing the welding tool 504 of the fifth embodiment, the same effect as that of the welding tools 4, 204 described above can be obtained. It should be appreciated that the concavo-convex portions 400 of the mounting portion 524 may be formed in either one or both of end faces provided in the axial direction.

Figure 22:
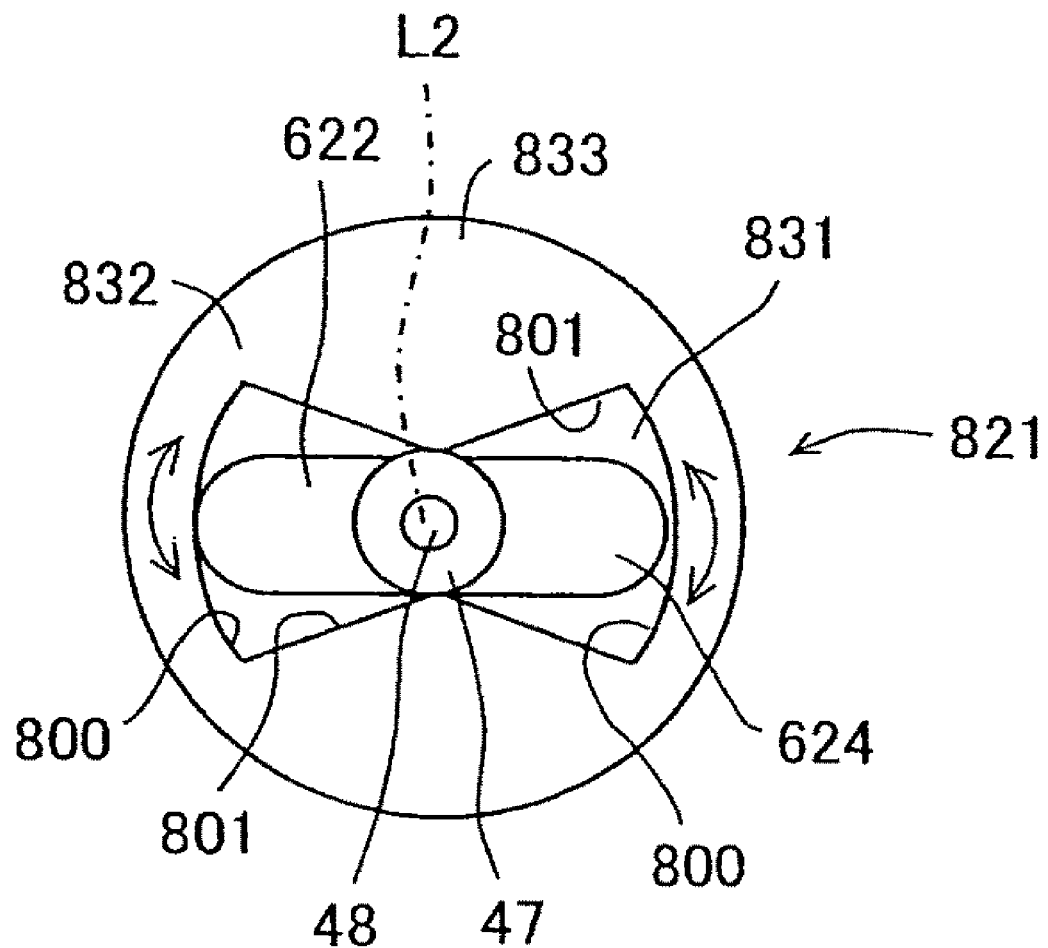
FIG. 22 is a bottom view showing a stirring rod 821 of yet another embodiment according to the present invention.

FIG. 22 is a bottom view showing a stirring rod 821 of yet another embodiment according to the present invention. The stirring rod 821 includes a positioning projection or fitting portion as described above. The welding tool 622 is positioned coaxially with the stirring rod 721 such that it can be angularly displaced within a predetermined angular range with respect to the axial direction. This can facilitate attachment of the welding tool 622 to the stirring rod 821. Upon welding, the welding tool 622 can be angularly displaced within a predetermined range while keeping its state coaxial with the stirring rod 821. Namely, the welding tool 622 will eventually abut the positioning projection or fitting portion formed in the stirring rod 821, as such preventing further angular displacement. Interposing both end faces of the mounting portion 624 between the fixing member 45 and the stirring rod 821 to restrict displacement in the axial direction of the welding tool 622 is the same as described in the previous embodiments. In this way, influence of the angular displacement of the welding tool 622 on the stirring rod 821 can be eliminated, thereby to perform more preferred fiction stir welding.

The stirring rod 821 includes a fitting portion 832 in which a fitting recess 831 is formed, and the fitting recess portion 831 is formed to extend in an externally threaded portion 833. The fitting portion 832 is formed such that two spaces each having a generally-fan-like shape are arranged on opposite sides across the axis L2 of the stirring rod 821. The fitting portion 832 includes first circumferential faces 800 each centered at the axis L2 and extending to keep a distance of a radius from the axis L2 and second circumferential faces 801 each extending in the radial direction toward the axis L2 from each edge point of the first circumferential face 800.

In this embodiment, the welding tool 622 is arranged coaxially with the stirring rod 821 while the mounting portion 624 is fitted in the fitting recess 831. In this state, when the mounting portion 624 is angularly displaced in one direction about the axis L2, a portion of the outer periphery of the mounting portion 624 is in contact with one of the second circumferential faces, thereby to prevent further angular displacement.

The welding tool of each embodiment described above can be used appropriately in spot welding for steel materials which are usually difficult to be welded. However, this welding tool can also be applied to other materials, for example, aluminum materials, aluminum alloys and the like, which are not so difficult to be welded. Furthermore, this welding tool may be used in other applications than spot welding.

The shapes of the fitting portion 32 and mounting portion 24 described above are by way of example only, and any configurations can be applied, provided that appropriate structures which enable attachment of the welding tool to the stirring rod 17 or fixing member 45 are provided to either of the stirring rod 17 and fixing member 45 as well as to the welding tool 22. For example, a fitting recess may be formed in the welding tool 4 while a fitting portion to be engaged in the fitting recess may be provided to the stirring rod 17 or fixing member 45. While the configuration in which the welding tool is fixed to the stirring rod 17 by using the fixing member 45 has been described in the above embodiments, the welding tool may be directly fixed to the stirring rod 17 without using the fixing member 45. For example, threads may be formed in the welding tool. The configuration of the welding machine 51 may be altered as needed. For example, it need not be moved by an articulated robot. Alternatively, the stirring rod 17 may be fixed to the welding machine 51. While the base material of the welding tool has been described as silicon nitride, it may be formed from other materials than silicon nitride, provided that the materials have proper stiffness. For example, it may be a tool material containing at least any of nitrides, oxides and carbides.

Although the invention has been described in its preferred embodiment with a certain degree of particularity, obviously many changes and variations are possible therein. It is therefore to be understood that the present invention may be practiced otherwise than as specifically described herein without departing from the scope and spirit thereof.

What is claimed is:

1. A friction stir welding tool for use in performing solid phase welding on a welding portion of materials to be welded, by pressing the welding tool against the welding portion of the materials to be welded while rotating the welding tool, and forcing the welding tool to be advanced into a softened portion which is softened by frictional heat while stirring the softened portion,
    wherein the welding tool includes a mounting portion having a first face and a second face, the mounting portion being configured to be inserted into a fitting recess formed at an end of a stirring rod of a friction stir welding machine, a first shoulder portion projecting from the first face of the mounting portion, a second shoulder portion projecting from the second face of the mounting portion, a first pin portion projecting from an end face of the first shoulder portion, and a second pin portion projecting from an end face of the second shoulder portion wherein the first and second shoulder portions and the first and second pin portions are coaxially disposed so as to be aligned with an axis of the stirring rod when the friction stir welding tool is removably attached to the end of the stirring rod.

2. The friction stir welding tool according to claim 1, wherein at least one of the first and second faces of the mounting portion is provided with concavo-convex portions.

3. The friction stir welding tool according to claim 1, wherein a coating comprising aluminum nitride is formed on at least a region of the friction stir welding tool to be in contact with the materials to be welded.

4. The friction stir welding tool according to claim 3, wherein the coating is formed by any one of chemical vapor deposition, physical vapor deposition and thermal spraying.

* * * * *